United States Patent Office 3,390,216
Patented June 25, 1968

3,390,216
VACUUM EXTRUSION SHAPING OF
CERAMIC MATERIALS
Kaoru Umeya, Sendai, and Takaaki Watanabe and Yoshiaki Kondo, Urawa, Japan, assignors to Mitsubishi Genshiryoku Kogyo Kabushiki Kaisha, Tokyo, Japan
Filed July 5, 1963, Ser. No. 293,077
6 Claims. (Cl. 264—102)

This invention relates generally to improvements in extrusion shaping techniques and more particularly to a method of vacuum extrusion of ceramic materials and the like and an apparatus for carrying out the same.

At present, in order to extrude ceramic materials, there have been commonly utilized the type of processes using auger machines and the type of processes using extrusion machines.

According to the type of processes using auger machines which are hereinafter called an "auger process" an extrusion cylinder in which raw material is accommodated is exhausted and gases such as air contained in the raw material are withdrawn. Then by means of an auger rotating within the extrusion cylinder, the degassed mass is forced out from the cylinder to provide a formed member of any desired shape such as a rod-like shape. The auger process has advantages such as facilitation of degassing and a high utility factor for work hardening as will be later described but it is advantageous in that, because the screw portion of the auger is rotated to provide a pressure under which the mass is extruded from the extrusion cylinder to be shaped, the resulting product is likely to have an uneven bulk density and to be twisted. These disadvantages are difficult to eliminate completely and are striking particularly in the case of addition of any suitable organic binding agent to a nonplastic material intended to be shaped which imparts to the material a plasticity resembling that of a plastic mass of ceramic material.

On the other hand, the type of processes using extrusion presses which are hereinafter called "a pressing process" can reduce or minimize the disadvantages of the auger process such as uneven density and torsion because an extrusion pressure exerted upon the raw plastic mass is provided by a piston adapted to be moved straight in its axial direction, but it is difficult to apply a vacuum to the raw materials because of the design and construction of an extrusion apparatus. If degassing were effected by using such a press without any modification then degassing will consume a long time and satisfactory degassing can not be expected. In addition, the pressing process is disadvantageous in that the raw mass is decreased in plasticity.

Thus if either the auger process or the pressing process is singly used, a shaped member or ceramic material which is homogeneous and long can not be produced with a high degree of accuracy of dimension.

In order for the inherent disadvantages of both the auger and the pressing process to cancel out each other, it has been already proposed to use an auger machine with a separate extrusion press in such a manner that a mass of ceramic material is first passed through the auger machine to form a pre-shaped member which, in turn, is used as a raw material for the extrusion press. This allows, on one hand, the degassing treatment to be quite satisfactorily effected and, on the other hand, causes the marks of torsion on a shaped member exhibiting the remnants of the spiral structure of the member to disappear. Thus the resulting products are improved in homogeneity and are free from the defects resulting from the single use of either the auger or the pressing process as previously described. However, the combined use of both processes can not provide a shaped member of high bulk density because a mass of ceramic material to be shaped has a work hardening property and hence is not satisfactory to provide a high quality shaped member.

Accordingly, it is an object of the invention to provide an improved method of producing high quality extrusion shaped members of ceramic materials without reducing their bulk densities and still retaining the advantages of the auger and pressing processes as previously described.

It is a more special object of the invention to provide an improved method of extrusion shaping relatively long members of ceramic materials having high bulk densities with a high degree of accuracy of dimension.

It is another object of the invention to provide an improved apparatus for producing high quality extrusion shaped members of ceramic materials homogeneous and high in bulk density with a high degree of accuracy of dimension.

Also it has been common practice to use a cold compaction process to shape powders of certain metallic compounds such as alumina, uranium dioxide or thorium oxide. However, this process can only provide relatively short pellets having a ratio of length to diameter of cross section equal at most to the order of two but it is impossible to provide long products. In certain applications, it is very desirable to produce shaped members of such materials. Since the aforesaid metallic compounds per se have no plasticity neither the auger nor the pressing processes can provide sound shaped members thereof as previously pointed out.

Therefore, it is another object of the invention to provide an improved method of extrusion shaping relatively long members of certain metallic compounds such as alumina, uranium dioxide and thorium oxide homogeneous and high in both bulk density and rectilinearity with a high degree of accuracy of dimension.

With the above objects in view, the invention resides in a method of extrusion shaping a ceramic material or the like, comprising the steps of preparing a mass of the ceramic material, pre-shaping the mass by the auger process, and shaping the pre-shaping mass by the pressing process, said method being characterized in that the mass as pre-shaped is immediately vacuum degassed and subsequently subjected to the pressing process while the same is maintained in the degrassed state.

The invention as to both its organization and the manner of operation and practice as well as other objects and advantages thereof will become apparent from the following detailed description taken in conjunction with the accompanying drawings in which.

The invention is based upon the discovery that a mass of any ceramic material has a work hardening property sharply sensitive to the length of time which has elapsed after the same has been subjected to deformation.

Figure 1:
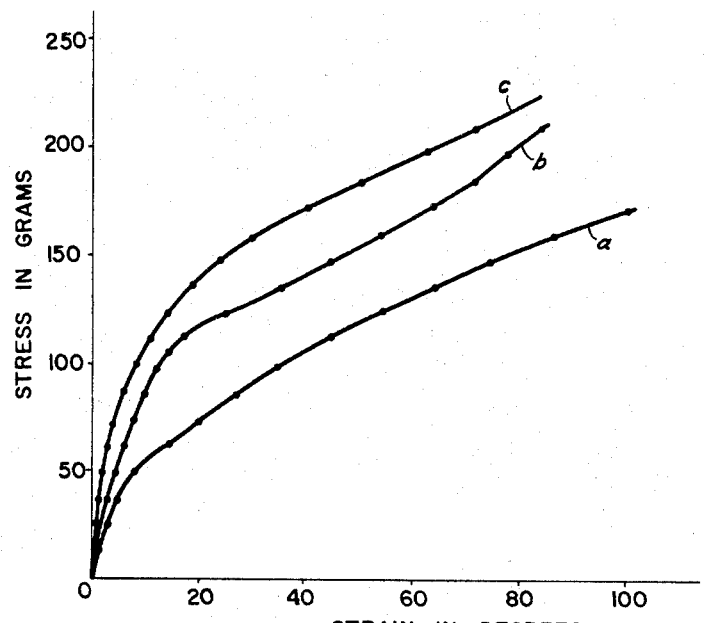
FIG. 1 is a graph illustrating the relationship between stress and strain for a mass of ceramic material containing 65% by weight of solids.

It is well known that, if any ceramic mass deformed once by having a pressure applied thereto is returned to its initial state the internal structure of the same can not be fully returned to its original state. As a result, when the mass deformed by a first force applied thereto is again sought to be deformed by a second force applied thereto the magnitude of the second force required to again deform the mass to the same amount as that obtained by the application of the first force is very much higher as shown in FIG. 1 illustrating the relationship between stress in grams per sq. cm. and strain in percent, in terms of deformation of a mass of ceramic material containing 65% by weight of solids. The curve $a$ indicates the result obtained during deformation of a maiden ceramic mass while each of curves $b$ and $c$ shows the results obtained during further deformation of the mass after it has been deformed as shown in the curve $a$. It is to be noted that the curve $b$ was obtained after a time interval between the first and second deformations of the mass which was relatively long (10 minutes) while with the curve $c$ said time interval was substantially negligible.

From FIG. 1 it is appreciated that any ceramic mass has a work hardening property sharply sensitive to the time interval between a first and a second deformation. In other words, the shorter the time interval between the first and second deformations the higher the work hardening property of the mass will be with the result that an extruded member has a higher bulk density.

As above pointed out, a mass exhibits a work hardening behavior in extrusion shaping and hence an extruded member is increased in homogeneity due to its self-adjusting function. In other words, the coefficient of friction between an operating surface of an extrusion cylinder and the adjacent surface portion of the mass within the same is different from the coefficient of internal friction of the mass originating from relative movement of the mass particles. For this reason, that portion of the mass contacting the operating surface of the extrusion cylinder tends to have a higher strain while the interior of the same tends to have a lower strain. Upon extrusion shaping the work hardening behavior can be more advantageously utilized in the auger process than in the pressing process using a piston for the reason that in the former process that portion of the mass positioned adjacent the free extremity of an auger is partially forced into a mass detaining space disposed in front of the auger whereas in the latter process the mass is compressed from all sides. In addition, the auger process permits the mass to be shaped to partially effect great movement with the result that the work hardening behavior of the mass can be fully utilized. Thus, it will be appreciated that the auger process provides shaped members high in bulk density.

As previously described, the auger process has been used in combination with the pressing process in order to eliminate the inherent disadvantages of both processes. In this case the actual operation should be performed such that an auger machine is first used to form a pre-shaped kneaded mass which is subsequently removed from the machine. The pre-shaped kneaded mass is then charged into a separate extrusion press where the same is degassed followed by extrusion shaping. Therefore a considerable length of time will lapse between formation of the pre-shaped slip and press extrusion of the same. Even if the operation just described were performed as rapidly as possible it will require at least several minutes and normally approximately 15 minutes. After such lapse of time the pre-shaped kneaded mass first formed by the auger process will be set due to its work hardening property. Thus the combination of the auger and pressing processes previously used might provide a mass degassed and free from torsion but the final product is inevitably reduced in bulk density.

It is recalled that a mass of any ceramic material has a work hardening property such that the shorter the time interval between a first and a second deformation the higher the property will be.

Thus the invention is characterized in that, immediately after a mass of ceramic material has been preliminarily shaped by the auger process the pre-shaped mass is passed through a vacuum degassing step without the same being exposed to the air and subsequently the pre-shaped mass is subjected to the pressing extrusion step while maintaining it in a degassed state.

Figure 2:
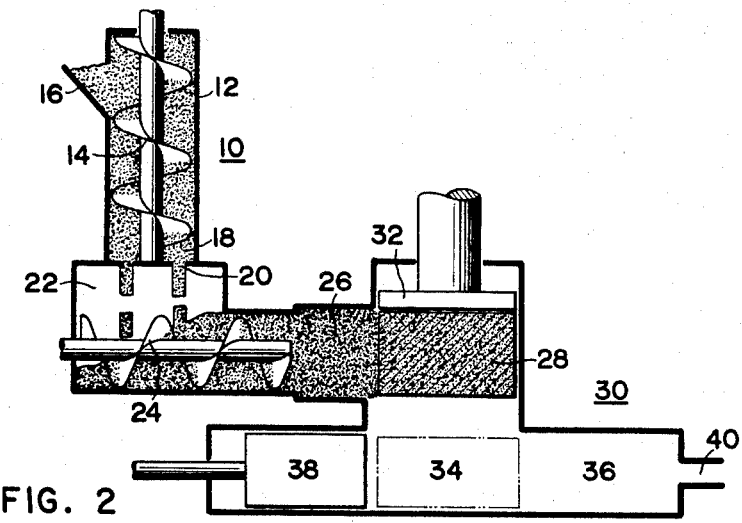
FIG. 2 is a diagrammatic elevational view, partly in section of an apparatus illustrating the principle of the invention.

Referring now to FIG. 2 of the drawings, there is diagrammatically illustrated an apparatus suitable for use in practicing the invention. The apparatus illustrated comprises an auger extrusion machine generally designated by the reference numeral 10 and an extrusion press generally designated by the reference numeral 30. The auger extrusion machine 10 is of the conventional type and includes an extrusion cylinder 12 shown in vertical position and a screw auger member 14 rotatably disposed within the extrusion cylinder 12. A mass of ceramic material to be shaped is fed into the cylinder 12 through an inlet 16 formed on the upper portion and is intruded into a mass detaining space 18 positioned on the lower portion of the cylinder as the screw auger member 14 is rotated until the same is forced out from the cylinder 12 through slit-shape outlets 20 into a vacuum chamber 22 connected to the cylinder. The mass leaving the outlets 20 is in the form of a strip and is subjected to degassing treatment in the vacuum chamber 22.

The vacuum chamber 22 which may be conveniently disposed horizontally or perpendicularly to the extrusion cylinder 12 includes a second screw auger member 24 rotatably disposed therein. As the second auger member 24 is rotated the mass is compressed and forced into a second mass detaining space 26 disposed in front of the auger member 24. Formed in front of the mass detaining space 26 is a pre-shaping chamber 28 maintained at substantially the same degree of vacuum as the vacuum chamber 22. The mass enters from the mass detaining space 26 into the pre-shaping chamber 28 where it is pre-shaped in a desired shape suitable for loading into the subsequent extrusion press 30.

As shown in FIG. 2, a transferring piston 32 is associated with the pre-shaping chamber 28 and serves to transfer the pre-shaped mass into a loading or inlet portion 34 for the extrusion press 30.

The extrusion press 30 includes the loading portion 34 also maintained at substantially the same degree of vacuum as in the vacuum chamber 22, a vacuum pressing chamber 36, a reciprocatable piston 38 normally disposed on that side of the loading portion 34 remote from the vacuum pressing chamber 36 and a nozzle 40 forming an exit for the pressing chamber. During its operation the piston 38 moves the pre-shaped mass into the vacuum pressing chamber 36 to compress the same and then pushes the compressed mass through the nozzle 40 into the desired shape.

As above described, the second mass detaining space 26 disposed on the extrusion side of the auger machine 22–24, the pre-shaping chamber 28 and the loading portion 34 for the extrusion press 30 communicate successively with the vacuum chamber 22 in the named order and are maintained at substantially the same degree of vacuum as in the chamber 22. This arrangement permits the length of time from the time when the mass has been pre-shaped by the auger machine to the time when the pre-shaped mass begins to be subjected to the operation of the extrusion press to be extremely short.

The auger members 14 and 24 are continued to be operated until the degassed mass has filled the pre-shaped chamber 28. However, only the auger member 24 may be stopped after the completion of the pre-shaping operation and simultaneously the vacuum chamber 22 may return to the normal pressure. This can effectively eliminate the undesired degassing operation of the auger member 24 during a period of time when the piston 38 is operating to perform the final shaping operation.

While the auger machine has been illustrated as comprising the first and second auger member 14 and 24 operatively coupled in series relationship to work a raw mass in two stages, a single auger member may be used to form a pre-shaped mass which, in turn is fed, as a raw charge, into a loading portion for the subsequent extrusion press with satisfactory results.

Thus it will be appreciated that, according to the teachings of the invention a pre-shaped mass formed by an auger extrusion machine is fed, in its degassed state into an extrusion press without exposing the same to the open air and that the pre-shaped mass fed into the press is immediately subjected to the subsequent pressing treatment.

Figure 3:
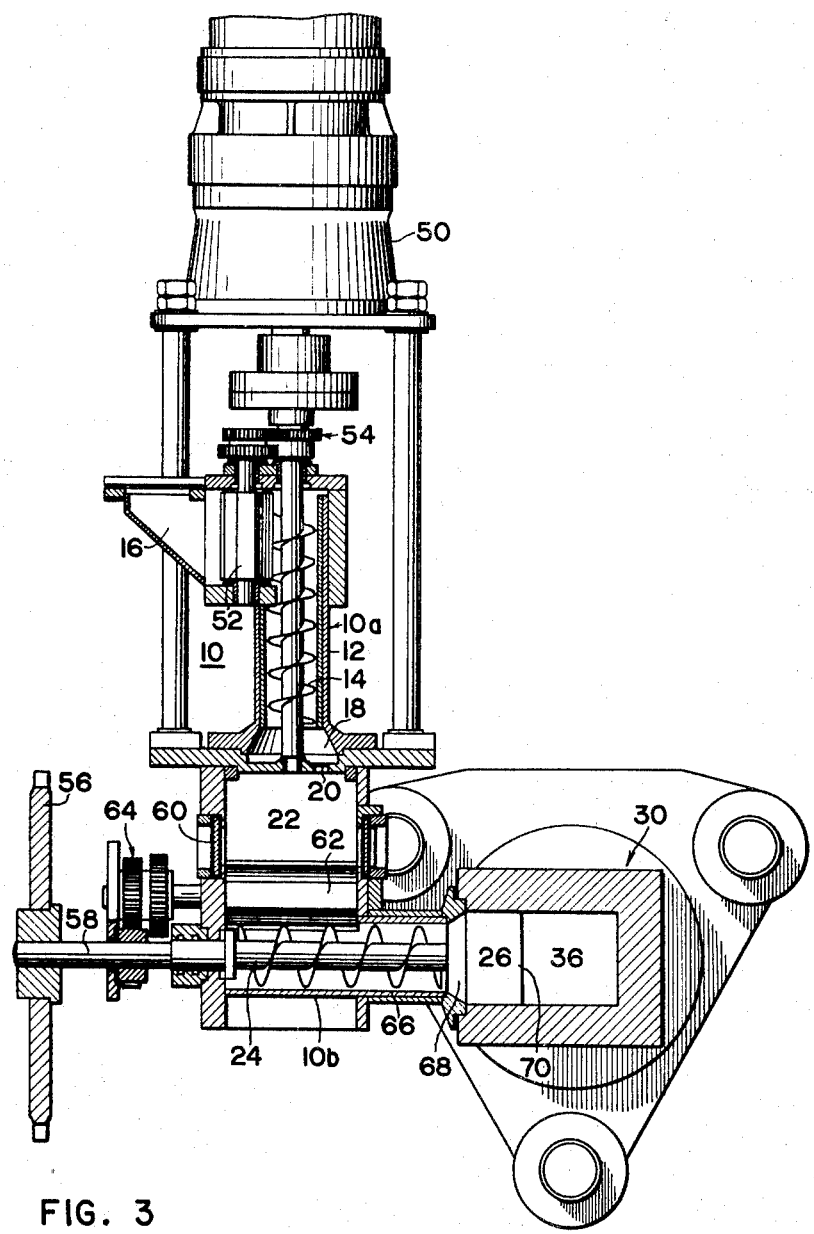
FIG. 3 is an elevational view, partly in vertical section of an apparatus embodying the teachings of the invention.
Figure 4:
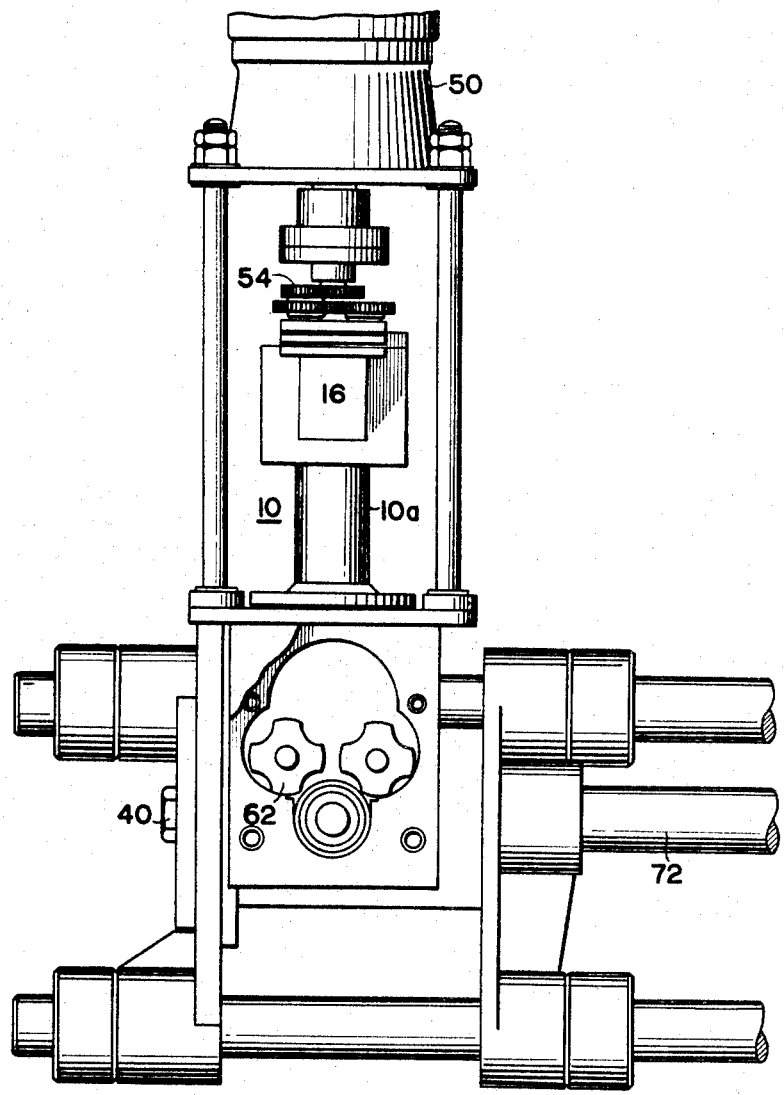
FIG. 4 is a side elevational view of the apparatus illustrated in FIG. 3 and as viewed from the lefthand side in FIG. 3 with a part cut away for the purpose of clarity.
Figure 5:
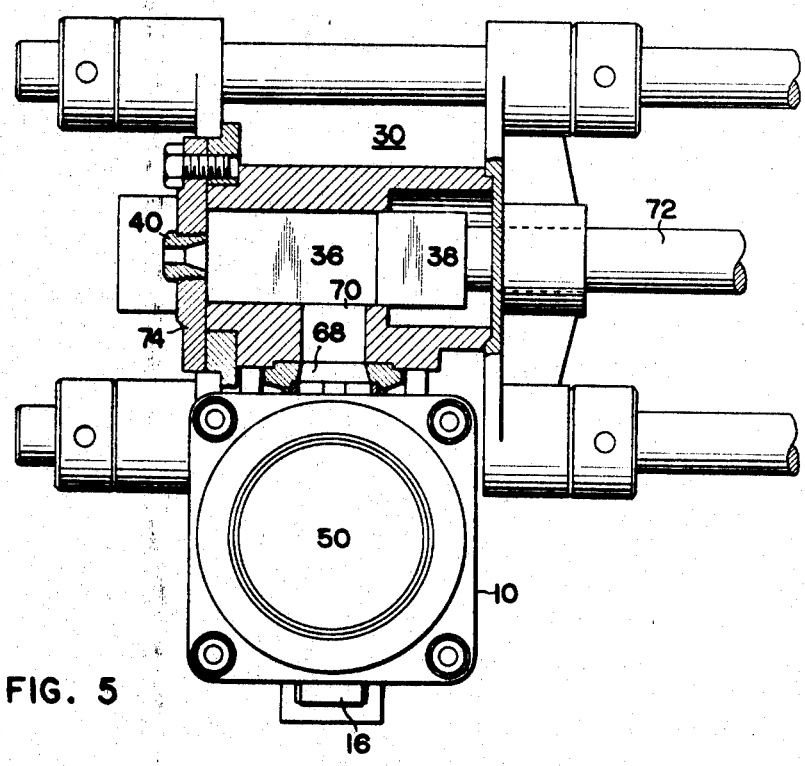
FIG. 5 is a plan view, partly in section of the apparatus illustrated in FIGS. 3 and 4.

Referring now to FIGS. 3 through 5 of the drawings wherein like reference numerals have been employed to identify components corresponding to those shown in FIG. 2, there is illustrated a shaping apparatus constructed in accordance with the teachings of the invention. As shown in FIGS. 3 and 4 a screw auger machine forming a first stage of the present apparatus and generally designated by the reference numeral 10 consists of an upper or first and a lower or second auger unit 10a and 10b respectively. The first auger unit 10a includes an extrusion cylinder 12 shown in a vertical position and a screw auger member 14 rotatably disposed within the extrusion cylinder 12 as in the arrangement shown in FIG. 2. The extrusion cylinder 12 is provided on the upper portion with an inlet 16 through which a mass of ceramic material can be fed into the cylinder. The screw auger member 14 is adapted to be driven by an electric motor with a reduction gearing rigidly secured to a supporting block 50 suitably mounted above the extrusion cylinder 12 to thereby be rotated within the cylinder. Provided between the inlet 16 and the adjacent portion of the cylinder 12 is a pair of rolls 52 adapted to be driven by the aforesaid motor through a suitable gearing 54.

A mass detaining space 18 is disposed adjacent to the lower end of the extrusion cylinder 12 and communicates with a vacuum degassing chamber 20 disposed below the same. To this end a plurality of openings 20 is formed on the bottom of the mass detaining space 18. The degassing chamber 22 forms a part of the second auger unit 10b and includes a second screw auger member 24 disposed therein horizontally and perpendicularly to the first auger member 14 for rotational movement. The second auger member 24 is adapted to be driven by a shaft 58 which may be driven by the aforesaid motor.

The vacuum degassing chamber 22 is maintained under a vacuum by any suitable means (not shown) and may have provided on the side wall or walls a viewing window or windows 60 for monitoring a mass in the same. Disposed within the vacuum chamber 22 is a pair of feed rolls 62 driven by a gearing mechanism 64 which, in turn, interlocks with the auger member 24 for the purpose of supplying the mass passed through the openings 20 to the auger member 24. In addition, the vacuum degassing chamber 22 has at its exit portion an extrusion cylinder 66 disposed coaxially to the auger member 24 and having its exit port 68 communicating with a second mass detaining space 26. The detaining space 26 communicates with an entrance 70 for an extrusion press to be subsequently described.

As best shown in FIG. 5 the extrusion press generally designated by the reference numeral 30 comprises a vacuum chamber 36 disposed substantially horizontally and perpendicularly to the axis of the second auger member 24 and the associated piston 38 including secured thereto a piston rod 72 which, in turn may be driven by a hydraulic device of the conventional type (not shown).

The vacuum pressing chamber 36 has the entrance 70. As above described, the entrance 70 communicates with the exit port 68 of the auger machine 10 through the mass detaining space 26 so that the interiors of both the mass detaining space 26 and the vacuum pressing chamber 36 are maintained at a similar degree of vacuum to that in the vacuum degassing chamber 22.

The operation of the apparatus thus far described will be more readily understood from the description previously given in conjunction with FIG. 2.

The vacuum pressing chamber 36 and the associated piston 38 may be preferably of rectangular or square cross-section. The reason for this is that any raw mass forced from the entrance 70 into the pressing chamber 36 is sheared at the entrance 70 leaving the sheared surface in the form of a plane. Thus that portion of the mass remaining in the detaining space 26 after the same has been sheared is planar and upon the next extrusion step that plane portion of the mass will be brought into plane contact with the opposite side wall of the pressing chamber and is allowed to be uniformly forced out from the chamber by the action of the piston 38.

In this way, the mass pushed into the pressing chamber 36 is compressed in the same by the action of the piston 38 while the same is maintained in its degassed state and then forced out from the chamber through a casting die or nozzle 40 into a desired shape. The die or nozzle 40 is supported on a cover plate 74 rigidly secured to the front end of the pressing chamber 36.

Figure 6:
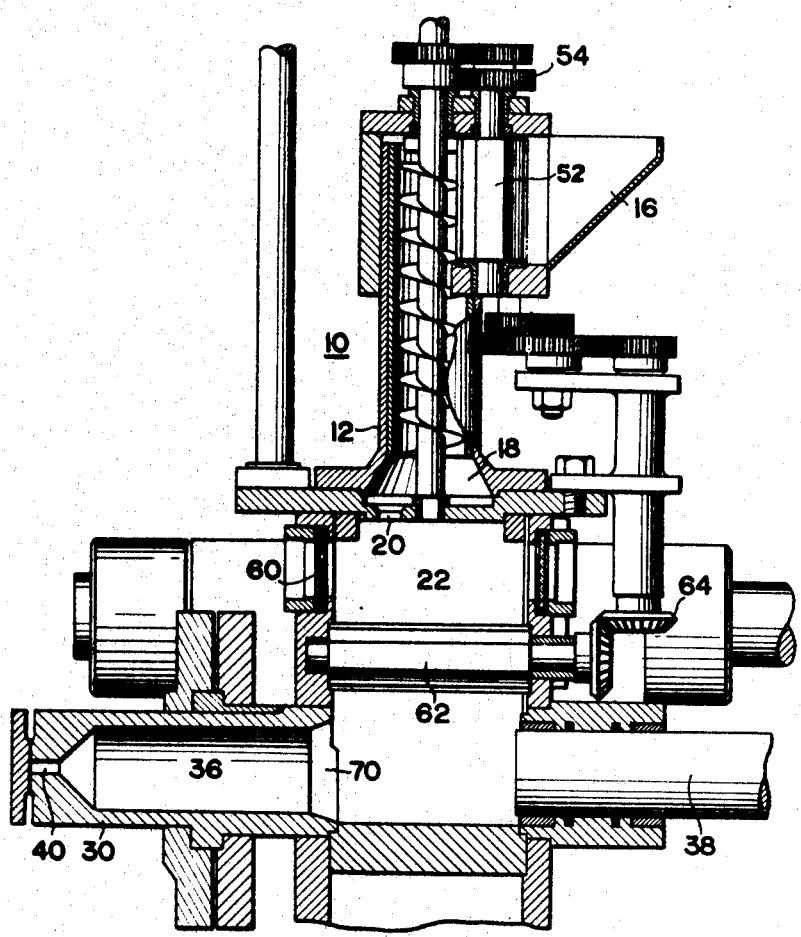
FIG. 6 is a view similar to FIG. 3 but illustrating a modification of the invention.

FIG. 6 illustrates another embodiment of the invention similar to that shown in FIGS. 3 through 5 excepting that the screw auger machine includes a single auger unit. In FIG. 6 like reference numerals indicate the components corresponding to those illustrated in FIGS. 3 to 5 inclusive. Therefore, the arrangement illustrated in FIG. 6 need not be described in detail. A single auger extrusion machine is vertically disposed and operatively coupled to an extrusion press disposed horizontally below the same.

Figure 7:
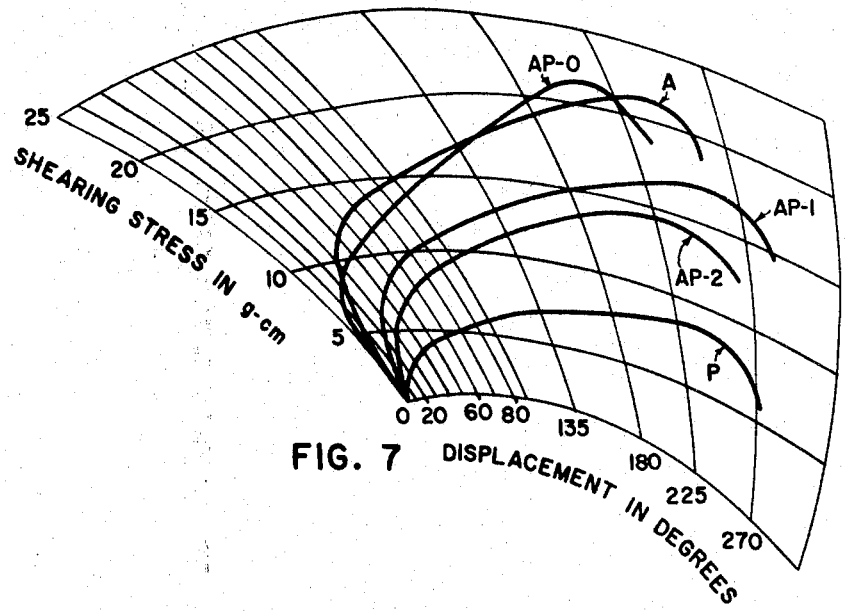
FIG. 7 is a family of curves illustrating a comparison of the method of the invention with the conventional processes in terms of torsional characteristics of the shaped products.

Referring now to FIG. 7 of the drawings there is illustrated a comparison of a shaped article according to the invention with shaped articles prepared by the conventional processes in terms of torsion characteristics with all the shaped articles produced from a kneaded mass of ceramic material prepared in a common batch. In FIG. 7 the curve A indicates the torsion characteristics of a shaped article prepared by a vacuum extrusion machine of screw auger type alone and the curve P the torsion characteristics of a shaped article prepared by an extrusion press alone. Curves AP–1 and AP–2 indicate the torsion characteristics of shaped articles prepared by first forming a pre-shaped member by a screw auger machine and then shaping the pre-shaped member into the the final shaped article by an extrusion press disposed independently of the auger machine. The curves AP–1 and AP–2 were obtained when the pre-shaped members were subjected to a pressing treatment after a lapse of time of 5 and 15 minutes respectively after having been subjected to the pre-shaping procedure. On the other hand, the curve AP–0 indicates the torsion characteristics of the shaped article according to the invention. From FIG. 7 it will be appreciated that the shaped article of the invention has torsion characteristics comparable to those obtained by using the auger machine. Other experiments showed that the present shaped articles were completely free from any gas such as air and exhibited no trace of torsion structure.

The following examples illustrate the practice of the invention.

A powder of a kaolin type clay was thoroughly mixed with water to form a plastic mass containing on the order of 32.5% by weight of water and having a plasticity represented by a shearing stress of 0.4 kg./cm.$^2$ and a shearing angle of more than 1.5 radians. In order to prevent any change in the content of water the plastic mass was placed in a closed vessel and after a lapse of 12 to 34 hours it was kneaded for 1 to 2 hours to prepare a mass.

As previously described in conjunction with FIG. 2, the mass thus prepared was passed through an auger machine to form a pre-shaped member in its degassed state. Immediately thereafter the pre-shaped member was charged into a vacuum extrusion press while maintaining the same in its degassed state. The vacuum extrusion press was maintained at substantially the same degree of vacuum as the space where the pre-shaped member was formed. Then the pre-shaped member was shaped in the extrusion press into the final product in the form of a relatively long circular rod.

For the purpose of preventing any deformation during the drying operation the rod thus prepared was put on a rotary roller device rotating at a low rate of 0.9 r.p.m. and dried by the irradiation of infrared radiation. The dried rod was cut into predetermined relatively large lengths and then sintered in air at 1300° C. for approximately two hours.

The sintered long rods had a high density, a high homogeneity, and a high degree of accuracy of dimension.

In order to shape a powder of alumina according to the process of the invention it has been found preferable that for satisfactory results, the powder used has an apparent density of 0.8 gram per cubic centimeter, an average particle size of 1.2 microns and such a distribution of particle sizes that the particles having particle sizes of less than 2 microns, from 2 to 8 microns and more than 8 microns respectively are contained in amounts of more than 30%, from 40 to 60% and less than 10% based upon the weight of the powder respectively. Added to such powder of alumina densified to a tap density of 1.6 grams per cubic centimeter was, by weight, 1% of carboxymethylcellulose, 0.7% of wax emulsion calculated in terms of a wax weight and from 15.5 to 17.5% of distilled water. The resulting mixture was kneaded for 3 to 5 hours. In order to prevent vaporization from the kneaded mixture, the same was then placed in a closed vessel and after a lapse of 12 to 34 hours it was kneaded for 1 to 2 hours to form a mass.

Then the mass thus prepared was processed in the same manner as that above described in conjunction with the clay mass and except for a sintering temperature ranging from 1600 to 1700° C. Thus sintered long rods were obtained having a high density, a high homogeneity and a high degree of accuracy of dimension as in the previous case.

In the case of a powder of fuel material such as uranium dioxide or thorium oxide to be shaped according to the process of the invention it has been found that, for satisfactory results, the powder used preferably has such a distribution of particle sizes that the particles having particle sizes of less than 1 micron, from one to several microns and more than several microns respectively are contained in amounts of more than 40%, from 30 to 50% and less than 20% based upon the weight of the powder, respectively. Added to such a powder of uranium dioxide or thorium oxide was, by weight, from 0.3 to 1.0% of carboxymethylcellulose, from 0.3 to 1.0% of a wax emulsion calculated in terms of a wax weight and from 40 to 70% of distilled water. The resulting mixture was processed in the same manner as previously described in conjunction with the alumina and clay mass to obtain a plurality of sintered, relatively long rods having similarly excellent properties. It is noted that for thorium oxide sintering was carried out in air at a temperature of from 1600 to 1700° C. and that for uranium dioxide sintering was carried out in hydrogen at a temperature of from 800 to 1000° C. for approximately one hour and then in hydrogen at a temperature of from 1600 to 1700° C. for approximately two hours.

As an example, the large length, high quality ceramics thus prepared are tabulated in the following Tables I, II, III and IV. In the tables, ceramics prepared from the same starting materials as the ceramics of the present invention according to the auger process (which is abbreviated to "A process" in the tables), the pressing process (which is also abbreviated to "B process" in the tables) and the conventional combination of the auger and pressing processes (which is abbreviated to "C process" in the tables) are also listed for the purpose of comparison. In all of the processes, the shaping die had a diameter of 11.4 mm. and was of the same configuration. Each measurement was conducted for 10 specimens.

TABLE I.—DIMENSION, SPECIFIC GRAVITY AND RECTILINEARITY OF GREEN AND SINTERED RODS OF KAOLIN TYPE CLAY

|  |  | Shaped rod | | | | Sintered rod | | | |
|---|---|---|---|---|---|---|---|---|---|
|  |  | A process | B process | C process | Present process | A process | B process | C process | Present process |
| Specific gravity in g./cc. | Maximum value | 1.80 | 1.78 | 1.79 | 1.80 | 2.53 | 2.46 | 2.45 | 2.49 |
|  | Minimum value | 1.65 | 1.62 | 1.64 | 1.71 | 2.36 | 2.30 | 2.33 | 2.31 |
|  | Fluctuation | 0.15 | 0.16 | 0.15 | 0.09 | 0.17 | 0.16 | 0.12 | 0.08 |
|  | Average value | 1.75 | 1.70 | 1.71 | 1.74 | 2.45 | 2.38 | 2.39 | 2.45 |
| Diameter in mm | Maximum value | 11.31 | 11.30 | 11.31 | 11.28 | 10.11 | 10.10 | 10.10 | 11.09 |
|  | Minimum value | 11.14 | 11.10 | 11.13 | 11.24 | 9.95 | 9.91 | 9.92 | 10.04 |
|  | Fluctuation | 0.17 | 0.29 | 0.18 | 0.04 | 0.16 | 0.19 | 0.18 | 0.05 |
|  | Average value | 11.26 | 11.21 | 11.24 | 11.25 | 10.07 | 10.01 | 10.04 | 10.06 |
| Rectilinearity in mm.* | Maximum value | 0.23 | 0.21 | 0.20 | 0.08 | 0.24 | 0.27 | 0.20 | 0.10 |
|  | Minimum value | 0.13 | 0.10 | 0.11 | 0.02 | 0.16 | 0.13 | 0.13 | 0.04 |
|  | Fluctuation | 0.10 | 0.11 | 0.09 | 0.06 | 0.08 | 0.14 | 0.07 | 0.06 |
|  | Average value | 0.17 | 0.16 | 0.16 | 0.05 | 0.19 | 0.20 | 0.17 | 0.07 |

*See footnote end of Table IV.

TABLE II.—DIMENSION, SPECIFIC GRAVITY AND RECTILINEARITY OF GREEN AND SINTERED RODS OF ALUMINA

|  |  | Shaped rod | | | | Sintered rod | | | |
|---|---|---|---|---|---|---|---|---|---|
|  |  | A process | B process | C process | Present process | A process | B process | C process | Present process |
| Specific gravity in g./cc. | Maximum value | 2.45 | 2.41 | 2.43 | 2.45 | 3.71 | 3.67 | 3.67 | 3.72 |
|  | Minimum value | 2.31 | 2.26 | 2.32 | 2.38 | 3.58 | 3.49 | 3.53 | 3.60 |
|  | Fluctuation | 0.14 | 0.15 | 0.11 | 0.07 | 0.13 | 0.18 | 0.14 | 0.12 |
|  | Average value | 2.41 | 2.32 | 2.38 | 2.41 | 3.65 | 3.60 | 3.62 | 3.66 |
| Diameter in mm | Maximum value | 11.24 | 11.23 | 11.21 | 11.22 | 9.78 | 9.77 | 9.75 | 9.75 |
|  | Minimum value | 11.01 | 11.05 | 11.04 | 11.18 | 9.58 | 9.61 | 9.61 | 9.71 |
|  | Fluctuation | 0.23 | 0.18 | 0.17 | 0.04 | 0.20 | 0.16 | 0.14 | 0.04 |
|  | Average value | 11.19 | 11.16 | 11.17 | 11.19 | 9.74 | 9.71 | 9.72 | 9.73 |
| Rectilinearity in mm. | Maximum value | 0.28 | 0.22 | 0.22 | 0.15 | 0.25 | 0.23 | 0.21 | 0.14 |
|  | Minimum value | 0.15 | 0.11 | 0.13 | 0.07 | 0.17 | 0.13 | 0.12 | 0.07 |
|  | Fluctuation | 0.13 | 0.11 | 0.09 | 0.08 | 0.08 | 0.10 | 0.19 | 0.07 |
|  | Average value | 0.22 | 0.18 | 0.17 | 0.11 | 0.21 | 0.18 | 0.15 | 0.10 |

*See footnote end of Table IV.

TABLE III.—DIMENSION, SPECIFIC GRAVITY AND RECTILINEARITY OF GREEN AND SINTERED RODS OF THORIUM OXIDE

|  |  | Shaped rod | | | | Sintered rod | | | |
|---|---|---|---|---|---|---|---|---|---|
|  |  | A process | B process | C process | Present process | A process | B process | C process | Present process |
| Specific Gravity in g./cc | Maximum value | 6.75 | 6.70 | 6.72 | 6.71 | 9.58 | 9.54 | 9.54 | 9.53 |
|  | Minimum value | 6.58 | 6.54 | 6.55 | 6.61 | 9.43 | 9.38 | 9.40 | 9.47 |
|  | Fluctuation | 0.17 | 0.16 | 0.17 | 0.10 | 0.15 | 0.16 | 0.14 | 0.16 |
|  | Average value | 6.65 | 6.61 | 6.60 | 6.66 | 9.51 | 9.46 | 9.48 | 9.50 |
| Diameter in mm | Maximum value | 11.40 | 11.38 | 11.39 | 11.35 | 10.12 | 10.10 | 10.11 | 10.07 |
|  | Minimum value | 11.23 | 11.21 | 11.23 | 11.29 | 9.97 | 9.95 | 9.97 | 10.03 |
|  | Fluctuation | 0.17 | 0.17 | 0.16 | 0.06 | 0.15 | 0.15 | 0.14 | 0.04 |
|  | Average value | 11.31 | 11.30 | 11.31 | 11.32 | 10.04 | 10.03 | 10.04 | 10.05 |
| Rectilinearity in mm.* | Maximum value | 0.24 | 0.22 | 0.21 | 0.11 | 0.26 | 0.24 | 0.20 | 0.10 |
|  | Minimum value | 0.09 | 0.11 | 0.10 | 0.03 | 0.13 | 0.12 | 0.11 | 0.03 |
|  | Fluctuation | 0.15 | 0.11 | 0.11 | 0.08 | 0.13 | 0.12 | 0.09 | 0.07 |
|  | Average value | 0.17 | 0.16 | 0.15 | 0.06 | 0.20 | 0.17 | 0.15 | 0.06 |

*See footnote end of Table IV.

TABLE IV.—DIMENSION, SPECIFIC GRAVITY AND RECTILINEARITY OF GREEN AND SINTERED RODS OF URANIUM OXIDE

|  |  | Shaped rod | | | | Sintered rod | | | |
|---|---|---|---|---|---|---|---|---|---|
|  |  | A process | B process | C process | Present process | A process | B process | C process | Present process |
| Specific gravity in g./cc | Maximum value | 6.51 | 6.43 | 6.42 | 6.46 | 10.41 | 10.40 | 10.31 | 10.40 |
|  | Minimum value | 6.35 | 6.21 | 6.24 | 6.37 | 10.21 | 10.09 | 10.09 | 10.25 |
|  | Fluctuation | 0.16 | 0.22 | 0.18 | 0.09 | 0.20 | 0.21 | 0.22 | 0.15 |
|  | Average value | 6.41 | 6.30 | 6.32 | 6.42 | 10.32 | 10.21 | 10.23 | 10.32 |
| Diameter in mm | Maximum value | 11.43 | 11.40 | 11.42 | 11.35 | 9.69 | 9.71 | 9.70 | 9.65 |
|  | Minimum value | 11.26 | 11.24 | 11.25 | 11.30 | 9.48 | 9.52 | 9.50 | 9.61 |
|  | Fluctuation | 0.17 | 0.16 | 0.17 | 0.05 | 0.21 | 0.19 | 0.20 | 0.04 |
|  | Average value | 11.34 | 11.32 | 11.33 | 11.32 | 9.62 | 9.63 | 9.64 | 9.62 |
| Rectilinearity in mm.* | Maximum value | 0.25 | 0.21 | 0.22 | 0.10 | 0.27 | 0.23 | 0.22 | 0.10 |
|  | Minimum value | 0.10 | 0.11 | 0.11 | 0.02 | 0.12 | 0.11 | 0.11 | 0.01 |
|  | Fluctuation | 0.15 | 0.10 | 0.11 | 0.08 | 0.20 | 0.12 | 0.11 | 0.09 |
|  | Average value | 0.18 | 0.19 | 0.19 | 0.05 | 0.17 | 0.16 | 0.16 | 0.05 |

*Rectilinearity is expressed by a measured magnitude of the maximum camber for the length of 20 cm. of the rod.

From the above tables it is appreciated that the green rod according to the invention has a density comparable to that obtained by the auger process with the fluctuation of the density approximately halved as compared with the auger process. It is noted that as to the diameters of the shaped and sintered rods fluctuations are noticeably small. Also, the results of the tests indicated that the shaped circular rod according to the invention deviated from the correct circularity approximately only a third to a fifth as much as those obtained by any conventional process.

From the foregoing, it will be appreciated that the objects of invention have been accomplished by the provision of a method comprising the steps of re-shaping a mass according to the auger process, immediately thereafter vacuum degassing the pre-shaped mass and subsequently subjecting the degassed mass to the pressing process while maintaining the same in the degassed state.

What we claim is:

1. A method of extrusion shaping a ceramic material, comprising the steps of pre-shaping a mass of a ceramic material by passing it through at least one auger extrusion machine, immediately vacuum degassing it and before it has time to set due to work hardening, directly passing it through a piston-type extrusion press for shaping it while maintaining the material in the degassed state.

2. A method of extrusion shaping a powder of material which has no plasticity per se, comprising the steps of adding a binder to the powder of the material to form a plastic mass, passing the mass through at least one auger extrusion machine to form a pre-shaped mass, immediately thereafter vacuum degassing the pre-shaped mass and before it has time to set due to work hardening, passing the degassed mass through a piston-type extrusion press to be formed in the final shaped member while maintaining the material in the degassed state.

3. An apparatus for extrusion shaping ceramic materials and the like, comprising at least one auger extrusion machine for pre-shaping a mass, a single short vacuum degassing chamber hermetically connected to the auger extrusion machine for degassing the pre-shaped mass and a piston-type extrusion press hermetically connected to the vacuum degassing chamber for shaping the degassed mass into the final shaped member.

4. An apparatus for extrusion shaping ceramic materials and the like, comprising an auger extrusion machine for pre-shaping a mass and having the auger thereof substantially vertically positioned, a vacuum degassing chamber which is short compared to the length of said auger extrusion machine hermetically connected to the output end of the auger extrusion machine at the lower end thereof for degassing the pre-shaped mass, and a piston-type extrusion press beneath the vacuum degassing chamber having a cylinder into which the vacuum degassing chamber opens laterally of said cylinder and hermetically connected to said chamber, the piston of said extrusion press moving substantially horizontally and transversely of the lower end of said chamber, whereby the pre-shaped material can pass into the extrusion press substantially immediately after the material is forced out of the auger extrusion machine.

5. An apparatus as claimed in claim 4 in which said vacuum degassing chamber has feed rolls therein adjacent the point at which the chamber opens into the piston-type extrusion press, and driving means coupled to said auger extrusion press and driving said feed rolls only when said auger extrusion press is operating.

6. An apparatus as claimed in claim 4 in which said vacuum degassing chamber has a substantially horizontal and further auger extrusion press in the bottom thereof, the outlet end of said further auger extrusion press opening directly into said piston-type extrusion press, and the auger of said further auger extrusion press being coupled to said auger extrusion press for driving the auger of the further auger extrusion press only when the first mentioned auger extrusion press is operating.

References Cited

UNITED STATES PATENTS

| | | | |
|---|---|---|---|
| 70,585 | 11/1867 | Long | 25—11 |
| 1,156,096 | 10/1915 | Price | 264—102 |
| 1,296,472 | 3/1919 | Brand | 264—102 |
| 1,614,526 | 1/1927 | Lambie et al. | 264—102 |
| 1,898,381 | 2/1933 | Mooney | 25—11 X |
| 1,900,797 | 3/1933 | Cawood. | |
| 2,078,565 | 4/1937 | Durst et al. | 264—102 |
| 2,198,612 | 4/1940 | Hardy. | |
| 2,253,699 | 8/1941 | Goss | 264—102 X |
| 2,296,516 | 9/1942 | Goss | 18—5 |
| 2,471,563 | 5/1949 | Gates. | |
| 2,628,401 | 2/1953 | Fiedler | 25—11 |
| 1,699,502 | 1/1929 | Crawley | 264—102 |
| 1,987,359 | 1/1935 | Brown | 264—102 |
| 2,024,025 | 10/1935 | Child et al. | 264—102 |

FOREIGN PATENTS

| | | |
|---|---|---|
| 412,248 | 1934 | Great Britain. |
| 552,866 | 1956 | Italy. |
| 44,108 | 9/1938 | Netherlands. |

JAMES A. SEIDLECK, *Primary Examiner.*

ALEXANDER H. BRODMERKEL, *Examiner.*

J. H. WOO, *Assistant Examiner.*